United States Patent [19]

Limberger

[11] 3,748,038

[45] July 24, 1973

[54] DEVICE FOR PRODUCING COPIES USING A TRANSFER MATERIAL

[75] Inventor: Walter Limberger, Hamburg-Poppenbuettel, Germany

[73] Assignee: Lumoprint Zindler KG, Hamburg, Germany

[22] Filed: Dec. 23, 1971

[21] Appl. No.: 211,603

[30] Foreign Application Priority Data

Dec. 23, 1970 Germany .................. P 20 63 480.4

[52] U.S. Cl. .................................. 355/100, 355/64

[51] Int. Cl. .......................................... G03b 27/10

[58] Field of Search ....................... 355/100, 99, 97, 355/16

[56] References Cited

UNITED STATES PATENTS 3,534,674 10/1970 Nielser .......................... 355/100 X 3,031,941 5/1962 Moser ............................ 355/100 X

*Primary Examiner*—Richard L. Moses

*Attorney*—Toren and McGeady

[57] ABSTRACT

An improved device for producing copies, with an exposure plate and a vertically movable contact pressure cover associated therewith, processing an exposed transfer material and a receiving material, to which the picture is transferred by means of a transfer device, possibly including an exposure section of the device, and wherein the transfer material is stored on a reel in the form of a continuous band. In this improved device, the band-like transfer material is deflected to a storage reel, and a separating and transport mechanism enables the receiving material to be detached from the transfer material without moving the latter. In addition, the device includes an improved layout of the heating mechanism.

12 Claims, 6 Drawing Figures

Patented July 24, 1973

3,748,038

5 Sheets-Sheet 1

Patented July 24, 1973

3,748,038

5 Sheets-Sheet 2

Patented July 24, 1973

3,748,038

5 Sheets-Sheet 4

DEVICE FOR PRODUCING COPIES USING A TRANSFER MATERIAL

BACKGROUND OF THE INVENTION

Known devices, comprising an exposure plate in the upper surface of a housing, have the advantage that copies may be made from books and from foliate originals. It is also known to conduct band-like transfer material over the exposure plate and to place the original on the transfer material for exposure after opening the cover.

Automatic devices of this kind are very complicated and require much space. In addition, known copiers have the drawback that the transfer material, which is advanced after the exposure with the exposed section into a transfer and developing device, must again be returned after the transfer by a certain amount, in order to utilize the whole of the transfer material. This additional process step makes the whole construction of the device both more complicated and more time-wasting.

SUMMARY OF THE INVENTION

Where mention is made in the following that the picture is transferred to a transfer device, possibly incorporating a developing device, this includes also arrangements using only a transfer device, in which the developing device is mounted in the downstream path of the receiving material.

The invention has the object of providing an automatically operating device of the general type hereinbefore mentioned, which device occupies only little space and may therefore be small and compact, and in which also the additional step of returning the transfer material has been avoided.

It is a further object of the invention to provide an automatic device of the kind hereinbefore described, in which a separating and transport mechanism is arranged at the outlet of the transfer and developing device, which deflects the band-like transfer material to a storage reel and transports the receiving material, which is guided during an exposure in sheets into a ready position in front of the transfer and developing device, to a developing section, wherein switching and transport means are arranged in the path of the transfer material as well as of the receiving material, in order to transport both materials into the immediately downstream transfer and developing device, whereby the transfer material is advanced by a distance corresponding to an exposed section and not exceeding the size of the exposure plate. The separating and transport device is an essential element enabling at the same time the receiving material to be detached from the transfer material without moving the latter, so that it remains in its position in which the trailing edge of the exposed section is directly adjacent to the exposure plate. The reference that the transport of the transfer material should not exceed the size of the exposure plate includes the possibility of selecting a smaller transportation step, for example for copying originals having only half the length of the exposure plate.

It is a further object of the invention to provide a device of the type hereinbefore described, in which the separating and transport mechanism comprises a pair of transport rollers adapted to be moved in its entirety, and to which is associated on the inlet side a reversing roller for the transfer material. This unit is adapted to be moved towards the transfer and developing device, and preferably into a gap at the outlet of this device. In this manner, the transfer material is detached by the deflecting roller, and the pair of transport rollers is moved into the transfer and developing device to collect the receiving material, whilst the deflecting roller releases the leaving edge of the receiving material from the transfer material, permitting it to enter between the transport rollers of the said pair.

It is a further object of the invention to provide a copying device of the kind hereinbefore mentioned, in which the transfer and developing device is a heater, comprising a plate-shaped heating element and a contact pressure plate adapted to be moved towards each other in the working rhythm, wherein the contact pressure plate is located on the side of the transfer material. The unit of the separating and transport mechanism is adapted to be moved into a gap between the plate-shaped heater and the contact pressure plate.

With the construction as heating device, a particularly compact set-up may be achieved. Preferably, the plate-shaped heating element and the contact pressure plate are substantially vertical and adapted to be moved by means, such as eccentrics, against the action of springs, towards and away from each other, with the contact pressure plate being suspended hingedly from an edge of the exposure plate. In this manner, not only is the compactness of the construction improved, but an arrangement is achieved in which, owing to the suspension of the contact pressure plate, the transfer and developing device may be mounted immediately behind the exposure plate, wherein the deflection of the transfer material at the edge of the exposure plate results in a defined boundary between the exposure and transfer zones, and the articulated mounting of the contact pressure cover may be simple.

It is a further object of the invention to provide a copying device of the kind hereinbefore mentioned in which the roller unit of the separating and transport mechanism is mounted on a pivoting lever arrangement, adapted to be moved by means such as an eccentric, under cycle control against the action of a spring tending to withdraw the unit from the gap.

Where moving means have been mentioned above, these means also include levers and, more particularly, crank lever arrangements. The exemplified embodiment comprising eccentrics acting against the force of springs, represents a preferred embodiment which is compact, wear resistant and reliable in operation.

Preferably, a deflecting finger is mounted on the lower edge of the plate-shaped heater and maintains the sheet of receiving material in the transfer and developing device, and alongside which the pair of rollers of the separating and transport mechanism may be moved, whilst deflecting the finger.

It is a further object of the invention to provide a copying device of the kind hereinbefore mentioned comprising a guide plate mounted pivotably in the region of the roller of the pair of rollers, located on the side of the contact pressure plate, and the free end of which rests on a bottom surface of the housing the end of which is provided with a delivery mechanism. This improves the smooth transport of the receiving material. Obviously, where only a transfer device is mounted behind the exposure plate, an additional developing section may be arranged between the said guide and the delivery mechanism. This depends on the type of material to be processed and on the method. For example, the device with heat transfer and development may be used for materials in accordance with U.S. Pat. No. 3,207,897. For photoconducting copying material, a transfer device may be formed by an electrode arrangement, under the field of which latent pictures are transferred and developed in a downstream developing section.

It is a further object of the invention to provide, in a copying device in which the receiving material is pulled off a reel and cut, that the receiving material is stored in sheets in a stack cooperating with withdrawing means. A particularly advantageous construction is achieved by the substantially vertical arrangement of the stack, preferably on the side of the plate-shaped heater remote from the exposure device.

This embodiment offers already substantial advantages for a compact construction, because the stack and the transfer and developing device are arranged practically vertically adjacent to each other. The withdrawal of sheet material from a stack presents the problem that the withdrawing means do not always operate exactly, either because coated receiving sheets tend to stick to each other, or because the surface of a withdrawing roller has become too smooth after extended use. Unreliable operation may also result in consequence of the surface condition, particularly of coated sheets of copying material, being modified by temperature or air moisture. For this reason, a special ready position has been provided frequently in copiers, into which the foliate copying material is transported from a stack and which defines a certain position of the sheet. In this case, the sheet may be collected, for example as a function of the passage of an original in continuous exposure devices, or as a function of other transport movements from this defined ready position, thereby ensuring the accurate contact with the transfer material. The invention provides a surprising solution by arranging the withdrawing means at the lower edge of the stack, and providing a guide path directed upwardly parallel to the stack, at the lower end of which there is a continuously revolving pair of transport rollers defining a ready position, whilst its upper end contains a pair of switching transport rollers for transferring the receiving material from the ready position into the transfer and developing device. This arrangement eliminates the hitherto used contact switch for the leading edge of the copying material sheet, and provides a definite stationary support on an anyway present revolving transport element.

The term "switching transport roller pair" relates to an arrangement such as decribed, e.g., in U.S. Pat. No. 3,552,849, consisting of a continuously revolving roller and a roller with a flat section. The latter roller is adapted to be locked in a position in which the flattened portion faces the continuously revolving roller under formation of a gap. When the lock is released, the circular part of the periphery makes contact with the continuously revolving roller to fulfill the transport function.

Preferably, a further pair of switching transport rollers is mounted in the path of the band-like transfer material between the separating and transport mechanism and the storage reel for transporting the transfer material by the required amount into the transfer and developing device.

Different devices may be used as controls, such as relays and the like. However, the preferred embodiment comprises a known control for working cycles in the form of a switching roller, described in detail further below, and whereby the functional parts are used in such a way that copies may be made directly in succession.

The invention will be further explained, by way of example, with reference to the accompanying drawings, in which.

Figure 1:
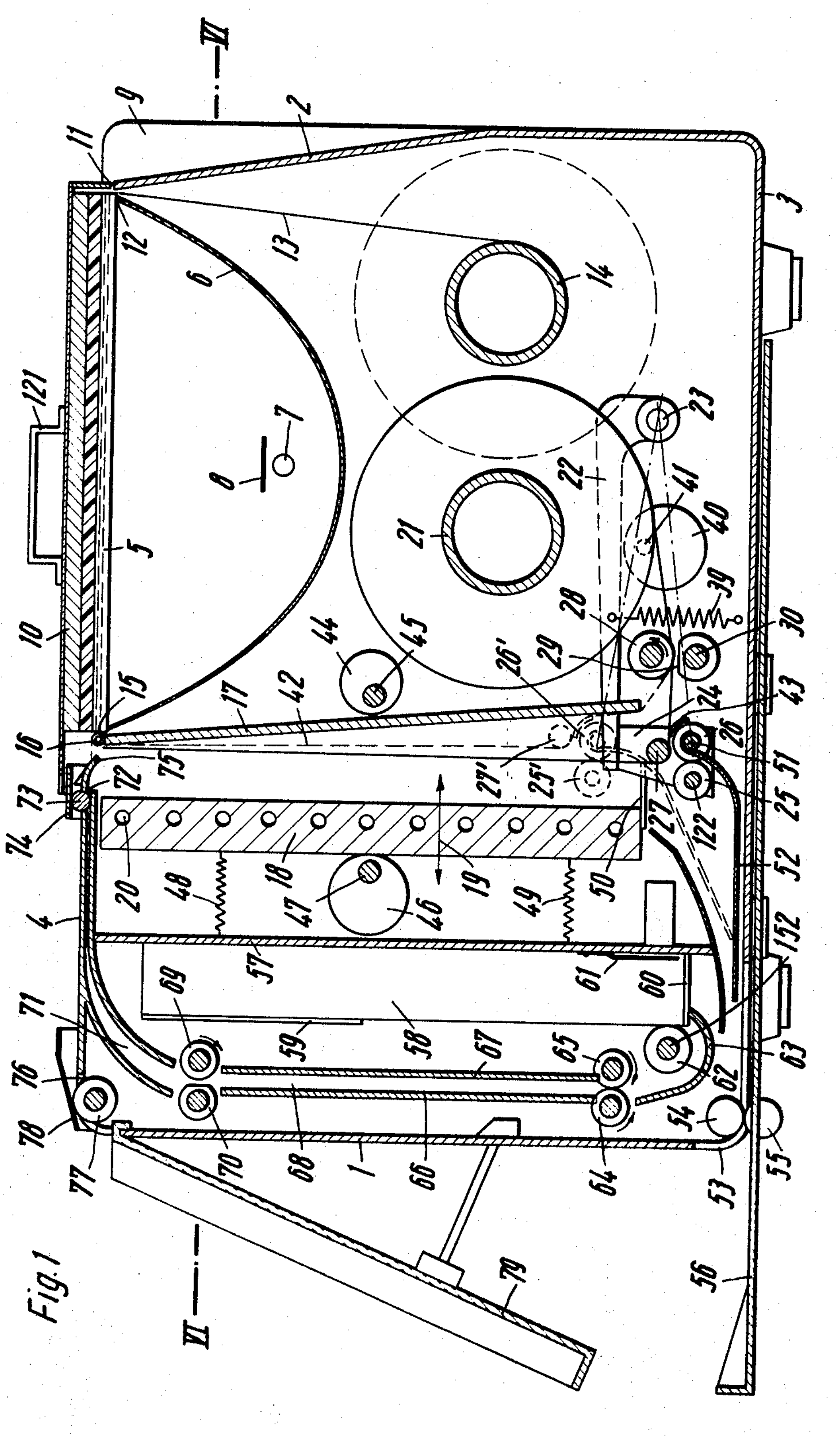
FIG. 1 is a cross-section and diagrammatical side elevation of a device in accordance with the invention.
Figure 5:
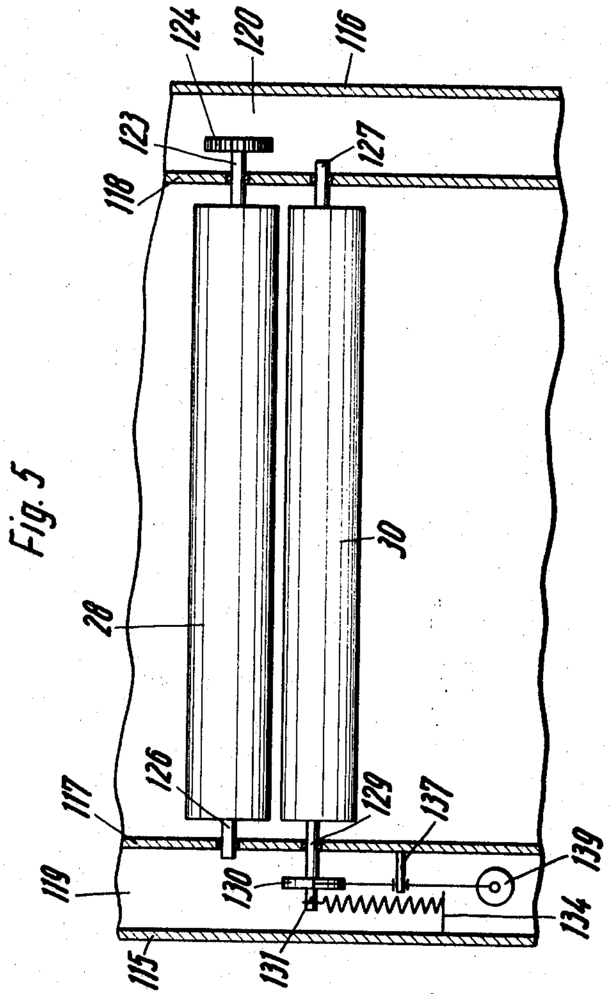
FIG. 5 is a side elevation of FIG. 4.

The apparatus according to FIG. 1 comprises a housing with side walls extending parallel to the plane of the drawing, end walls 1, 2 extending perpendicularly thereto, a base plate 3 and a top cover 4. In FIG. 5, the side walls are shown at 115 and 116. Within the side walls, there are assembly walls 117, 118, located parallel to the side walls and adapted to retain functional parts either fixedly or rotatively. For rotation, shafts extend through bearings in the assembly walls 117, 118 into the lateral spaces 119, 120 and co-act there with drive or control means.

The top wall 4 contains a transparent exposure plate 5, under which there is a reflector 6 with a light source 7 mounted therein. In an embodiment, in which the reflector is partly cylindrical, the light source 7 is a tubular lamp passing through the housing. Above the lamp, a shutter 8 ensures the uniform illumination of the exposure plate 5.

The exposure plate 5 is connected directly to the end wall 2 which extends upwardly obliquely towards the center of the device between the side walls (of which a part 9 of the rear side wall is shown), for example, in order to facilitate the mounting of books.

A contact pressure cover 10 is mounted above the exposure plate and has on its underside layers of a compressible material, e.g., of foam rubber. This contact pressure cover may be hinged, for example, above the rear side wall, the hinge pins extending parallel to the side wall. This cover is adapted to be opened from the front towards the back, as shown in FIG. 1 and may also be adapted to be removed entirely by means of a handle 121.

Between the upper edge 11 of the end wall 2 and the adjacent edge 12 of the reflector 6, there is a gap through which passes a band-like transfer material 13 which is stored on a reel 14.

The other edge 15 of the exposure plate has a hinge-like structure 16 on which a contact pressure plate 17 of a transfer and developing device is suspended. FIG. 1 shows this contact pressure plate 17 in a state in which the transfer and developing device is open. In addition, the transfer and developing device has a plate-shaped heater 18, adapted to move reciprocatingly in guides, not shown, in the direction of the arrow 19. The plate-shaped heater comprises heating channels 20, containing, for example, heating spirals connected to a power source. The temperature of the plate-shaped heater is controlled by a thermostat, not shown in detail.

The contact pressure plate 17 also separates the chamber under the reflector 6 from the transfer and developing device 17, 18. This chamber contains not only the storage reel 14 for the band-like transfer material, but also a storage reel 21. The storage reel 14 is affected by a brake, not shown, which prevents loops from forming by overrunning, when transfer material is pulled off. The storage reel 21 is connected to a drive motor, potentially via a slipping clutch. This motor may have the object of advancing the transfer material after a control and reeling it up. However, if the driving mechanism with the rollers 28 and 30 is provided for this purpose, the drive torque of the drive motor or the transmission torque of the slipping clutch may be so weak that the drive motor cannot operate against the resistance of the storage reel, without the support of the driving mechanism 28, 30.

The side walls, extending parallel to the plane of the drawings, contain pivotable levers, such as lever 22 in FIG. 1, with its pivot shown at 23. The levers arranged on both sides may be connected by cross members and extend on both sides of the contact pressure plate 17 into a zone located about vertically under the hinge joint 16. The free ends of levers 22 have plates 24 extending parallel to the side walls of the housing; at the lower end a pair of transport rollers 25, 26 is mounted between these plates, and at least one roller is driven by a flexible shaft. Above this pair of rollers, a reversing roller 27 is mounted freely rotatably between these plates 24 in such a mnner that a vertical tangent on the side remote from the contact pressure plate 17 passes through the point of contact between rollers 25, 26.

The transfer material, leaving the housing through the gap between 11 and 12, passes over the exposure plate 5, over the hinge joint 16, past the left side of the reversing roller 27, as viewed in FIG. 1, and to the storage reel 21. Between the unit consisting of rollers 25, 26 and deflecting roller 27 on one hand, and the storage reel 21 on the other, there is a pair of switching transport rollers, comprising the roller 28 revolving continuously in the direction of the arrow, and a roller 30 having a flattened portion 29. The roller 30 is adapted to be locked in the position shown, so that the transfer material passes through the open gap. Springs acting on the flattened roller 30 rotate this roller after its release, so that the uncut part of the periphery of the roller 30 makes contact with the periphery of the roller 28, and is thereby carried along, thus effecting a transport. Either, the periphery of the roller 30 is such that after one rotation, the transfer material 13 is transported in the plane of the drawing through the length of the exposure plate 5, or the locking mechanism is kept disengaged by a cam disc until a multiple revolution of the roller 30 has performed the required travel. The arrangement of this separating and transport device consisting of rollers 28, 30, is shown in detail in FIGS. 5 and 6. The roller 28 is rotatably mounted in the assembly walls 117, 118 between the housing side walls 115, 116. Its shaft end 123 extends into the chamber 120 and is there provided with a drive wheel 124 connected with the operational revolving drive means of the machine. The other shaft end 126 merely passes through the bearing in the wall 117. The roller 30 with the flattened portion 29 passes with one shaft end 127 through the wall 118, and with the other shaft end 129 through a bearing in the wall 117. In the chamber 119, the shaft end carries a disc 130 which is subjected eccentrically to the force of a spring 132, acting on a pin 131, and mounted on a spring point 134 on the side wall 115.

Figure 4:
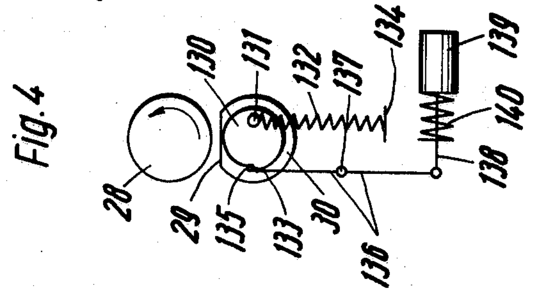
FIG. 4 is a section of FIG. 1, explaining the function of a pair of switching transport rollers.

The disc 130 may have relative to the pin 131 a circumferential step 133 into which engages the angled end 135 of a pivoting lever 136, whose pivot 137 may be mounted in the wall 117. The free end of the lever 136 may be connected with the armature 138 of a lifting magnet 139 which may be operated to release the roller 30. In this case, the spring 132 attracts the roller 30 in a clockwise direction (FIG. 4), so that the circumference adjacent to the flattened section 29 makes contact with the roller 28. A spring 140, located between the body of the magnet and an abutment on the armature rod 138 ensures after the de-energisation of the magnet that the angled end 135 travels along the circumference of the disc 130 and engages again into the stop 133, thereby locking the device in the starting position. With a sufficiently large diameter, one revolution of the roller 30 is sufficient to produce one transport step. If this is not the case, provisions are made to keep the lever 136 out of engagement for multiple revolutions of the roller 30.

Figure 2:
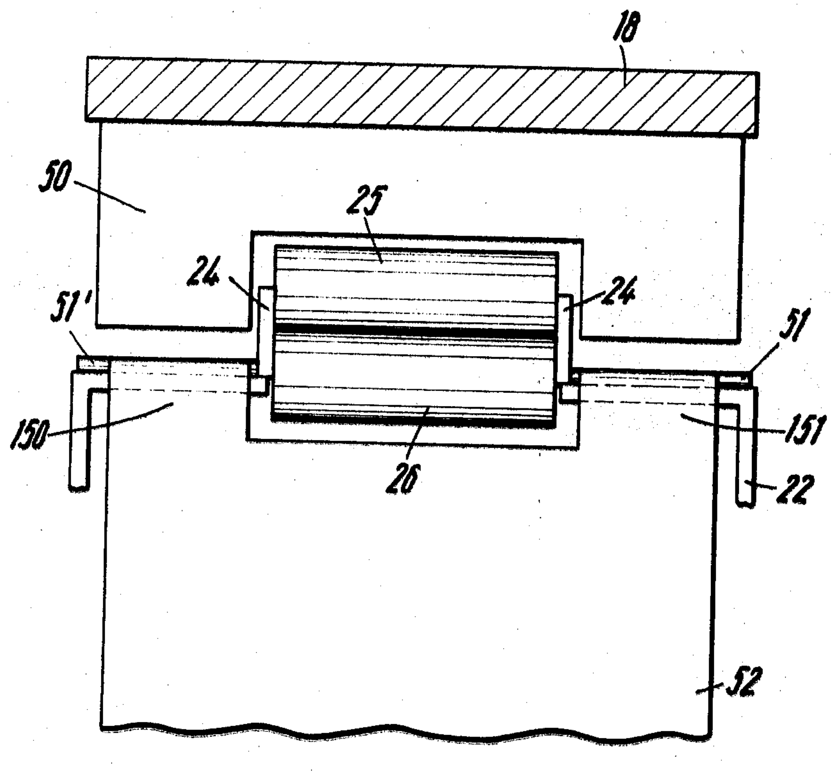
FIG. 2 is a plan view of a detail of FIG. 1.

The levers 22 of which there are two according to FIG. 2, one mounted in each wall 117, 118, are affected by tension springs 39, tending to pull the lever arrangement towards the bottom into the position shown. Eccentric discs 40 are mounted rotatably about a pivot 41 in the housing side walls under the levers 22. Such arrangements with eccentric discs will be descirbed in detail with reference to eccentrics 44, 46. The pivot is mounted in the assembly walls and is connected through a shaft end with drive means.

The eccentric discs are adapted to raise the lever arrangement and, therefore, also the unit comprising rollers 25, 26 and roller 27 into a position shown at 25', 26' and 27'. In this position, the contact pressure plate 17 is located with its lower end swivelled out towards the left, so that the transfer material travels along the dotted line 42. It passes about a special screening plate 43 around the outside of the roller 26 or 26'. The plate 43 is fixed to the plates 24, 24'.

Figure 6:
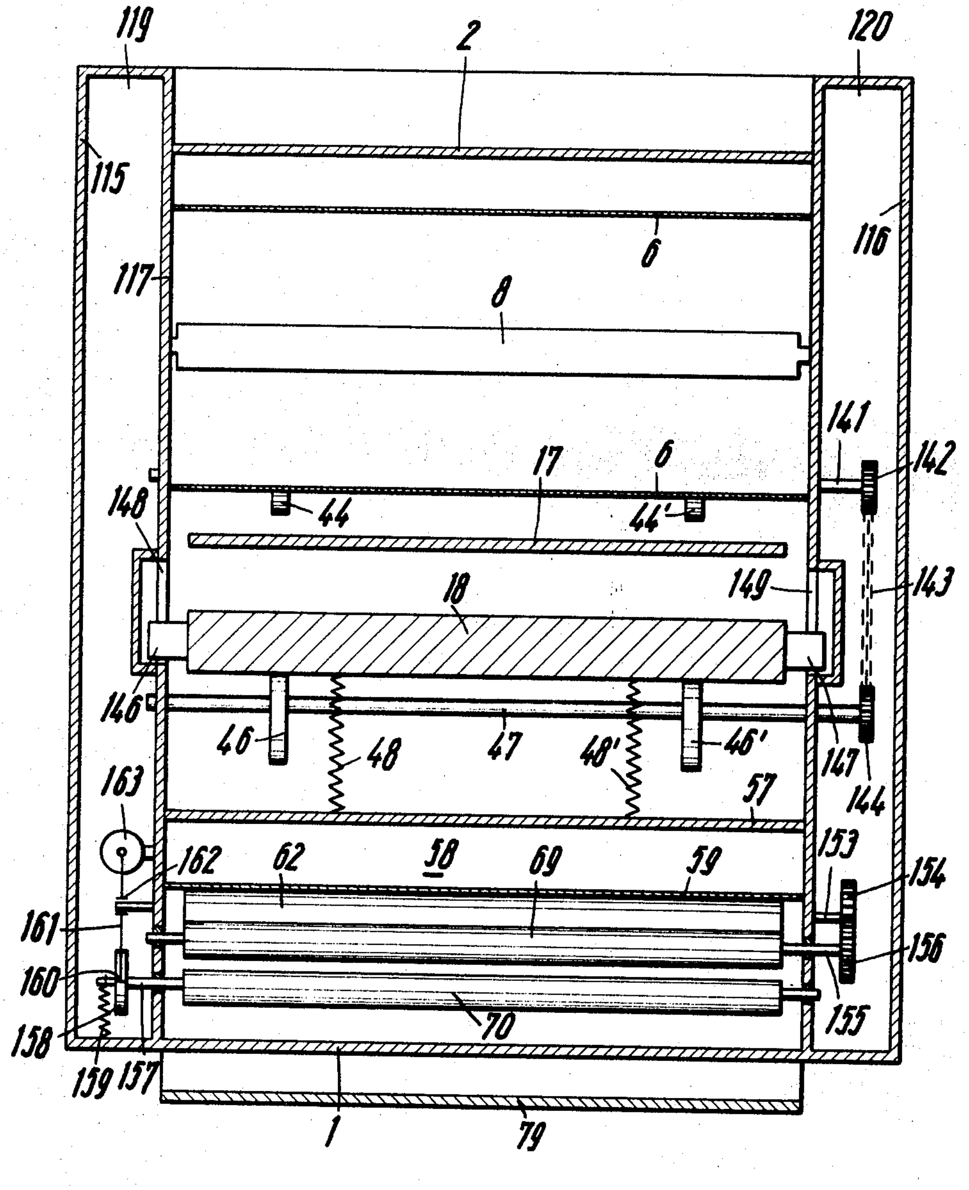
FIG. 6 is a plan view of the device of FIG. 1, in cross-section along the line VI—VI in FIG. 1.

The position of the contact pressure plate 17 just described is caused by the pull of the storage reel 21 on the transfer material, when the means for moving the contact pressure plate 17 are in the position shown in the drawing. These means may comprise eccentrics 44, 44' which are adapted to be rotated by a shaft 45 mounted in the assembly walls 117, 118. A shaft end 141 passes through the wall 118 and carries a drive element 142 in the form of a pulley or a sprocket (FIG. 6). This may be connected by a drive, e.g. a cable or a chain 143 with a drive wheel 144 on the end 145 of a shaft 47, mounted in the assembly walls 117, 118 and carrying eccentrics 46, 46' to be described in detail further below.

Oviously, an eccentric 44 and 46 may also be arranged centrally. Two eccentric discs 44, 44' and 46, 46' facilitate a symmetrical support.

Where, an eccentric is mentioned in the following this refers merely to a simplification.

The eccentric 44 is so dimensioned that it moves the contact pressure plate 17 into a substantially vertical position after rotation through 180°.

The actuating means of the plate-shaped heater 18 comprise a corresponding eccentric 46, or 46, 46', rotatable by the drive 144 about the shaft 47 mounted in the assembly walls for pressing the plate-shaped heater 18 in the direction of the arrow 19 against the vertically guided contact pressure plate 17. Either the plate-shaped heater 18 is actuated by springs 48, 48', 49 for ensuring continuous contact with the eccentric disc 46, or a special connection is provided between the circumference of this disc and the plate-shaped heater.

The plate-shaped heater 18 may have on the top and bottom edges strip-shaped projections 146, 147, guided in oblong slots 148, 149 (FIG. 6) of the assembly walls 117, 118. This arrangement ensures a parallel guiding action where the eccentric discs 46, 46' are only arranged at mid-height.

The lower edge of the plate-shaped heater carries a deflectable finger 50 past which the unit with the pair of rollers 25, 26 can be moved, whilst deflecting the finger. According to FIG. 2, the finger 50 may have a center recess through which a part of the unit with the rollers 25, 26 may pass, whilst the longer parts of the finger retain the copying material. A bent guide plate 52 is mounted pivotably about the end face shaft ends 51, 51' of the roller 26, in such a way that its end is movable on the bottom 3 of the housing towards a delivery mechanism. At its suspended end, the guide plate 52 has projections 150, 151 forming shells towards the bottom. The delivery mechanism comprises an opening 53 in the end wall 1, and a pair of rollers 54, 55 arranged in front of this delivery orifice, and of which at least one of the cooperating rollers is continuously driven. In addition, the delivery mechanism comprises a box-shaped withdrawing plate 56 on which the receiving material can be taken out.

In addition, the housing is divided by a vertical partition 57 mounted between the side walls and retaining, for example, springs 48, 48', 49. This vertical partition holds a stack 58 for sheets of receiving material, located between wall portions 59, 60, wherein the wall portion 60 supports the lower edges. The wall portions 59, 60 are mounted on the assembly walls 117, 118. Above the wall portions 60, a known spring 61 is mounted on the partition 57 and presses the lower edges against a withdrawing roller 62. The withdrawing roller 62 is mounted by means of a shaft 152 in the assembly walls 117, 118 and passes with a shaft end 153 through one assembly wall. This shaft end carries a drive wheel 154, connected with control means of the main drive as described further below. The spring 61 ensures permanent contact between the topmost sheet of the stack and the roller 62. This withdrawing roller is adapted to be operated intermittently in the cycle of the exposure. From the wall portion 60 extends an upwardly curved guide face 63 which supplies a sheet from the stack 58 to a pair of transport rollers 64, 65 continuously driven in the sense of the arrows. Above the rollers, guides 66, 67 form a vertical channel 68 parallel to the stack 58; the upper end of this channel cooperates with a pair of switching transport rollers with a continuously revolving roller 69 and a flattened roller 70. This pair of switching transport rollers corresponds to the pair of rollers 28, 30.

FIG. 6 shows that the rollers 69, 70, as well as the rollers 64, 65, the withdrawing roller 62 and the guide face 63 and guides 66, 67 etc. are mounted on the assembly walls 117, 118. It may be seen from FIG. 6 that one shaft end 155 of the continuously driven roller 69 extends into the chamber 120, carrying there a drive wheel 156 corresponding to the drive wheel 125 in FIG. 5. On the other side, a shaft end 157 of the flattened roller 70, corresponding to the shaft end 129 in FIG. 5, carries a disc 158 on which a spring 159, corresponding to the spring 132, acts eccentrically and the periphery of which has a recess 160 adapted to receive the bent end of a pivoting lever 161. This pivoting lever is pivotable about a pivot 162 and is connected at its free end with an actuating magnet 163, corresponding to the magnet 139. A return spring is arranged also in the magnet 163 for the pivoting lever 161.

Above the pair of switching transport rollers 69, 70, there is a channel 71, defined by a guide element terminating at 72 in the transfer and developing device between the plate-shaped heater 18 and the contact pressure plate 17. At the outlet, a transport roller 73 revolving continuously in the direction of the arrow, projects into this channel; the upper side of this transport roller is near an upper cover 74, open on one side towards the exposure plate 5, and on the other side towards the top wall 4 of the housing. Towards the exposure plate 5, a downwardly bulging surface 75 is arranged adjacent to the transport roller 73, so that its end facing the exposure plate 5 is lower than the top of the exposure plate, but terminates at spaced apart relationship therefrom or from the hinge joint 16.

At the end of the top wall 4 there is a perforation 76 through which projects the periphery of a roller 77 driven continuously in the direction of the arrow, and passing at minimum distance under a sloping channel-shaped cover 78. In this manner, an original passing between the cover 78 and the roller 77 is carried along and transported into the collector 79 arranged obliquely in front of the end face 1.

The function of the apparatus will now be explained, with inclusion of the control shown in FIG. 3. This control comprises a switching roller 80, carrying contacts along the generatrix 81, adapted to close contact switches for actuating the various elements.

In the starting position, the parts are located as shown in the drawing. Regarding the reels 14 and 21 it may be said that one of the reels is full and the other empty, and this changes as the one reels empties and the other fills up. Thus, both reels may be mounted relatively close to each other. The cover 10 is raised for placing an original with the picture facing downwards on the negative paper. Then the cover is lowered, thereby actuating a switch 82 which switches on the exposure light source 7 through a timing clock 83 for an adjustable period, and simultaneously starts the withdrawing roller 62. This causes a sheet of receiving material to be supplied to the pair of rollers 64, 65 and to be transported thereby, until the lower edge remains on the revolving rollers, with the upper edge positioned between the switching rollers 69, 70.

After the completion of the exposure, the cover 10 is opened, possibly unlocked automatically by means of magnets, as known in the art, and raised, and the pairs of switching rollers 28, 30 and 69, 70 are actuated, for example, for displacing the transfer material about the length of the exposure plate 5 parallel to the plane of the drawing, and also to move the receiving material through the channel 71 into the open gap between the plate-shaped heater 18 and the contact pressure plate 17. Then the actuating means or eccentric 44, 46 are rotated through 180°, for closing the transfer and developing device 17, 18, and for starting the transfer and developing processes. After a certain period, which depends on the material, the eccentrics 44, 46 are rotated further for opening the transfer and developing device and this is followed immediately by a rotation of the device actuating the lever arrangement 22, and formed by the eccentric 40. This causes the transfer material to be pulled off about the lower edge of the contact pressure plate 17 and the deflecting roller 27, whilst the receiving material enters with its lower edge between the incoming rollers 25, 26 which transport the receiving material over the guide plate 52 to the delivery mechanism 53.

Together with the movement of the transfer material after lifting the cover 10, also the original is taken along. Its leading edge encounters the surface 75, is gripped by the transport roller 73 and transported on the top wall 4 or to the transport roller 77, and thereby into the collector 79. A new original may be fitted and the process is repeated in the same manner.

Figure 3:
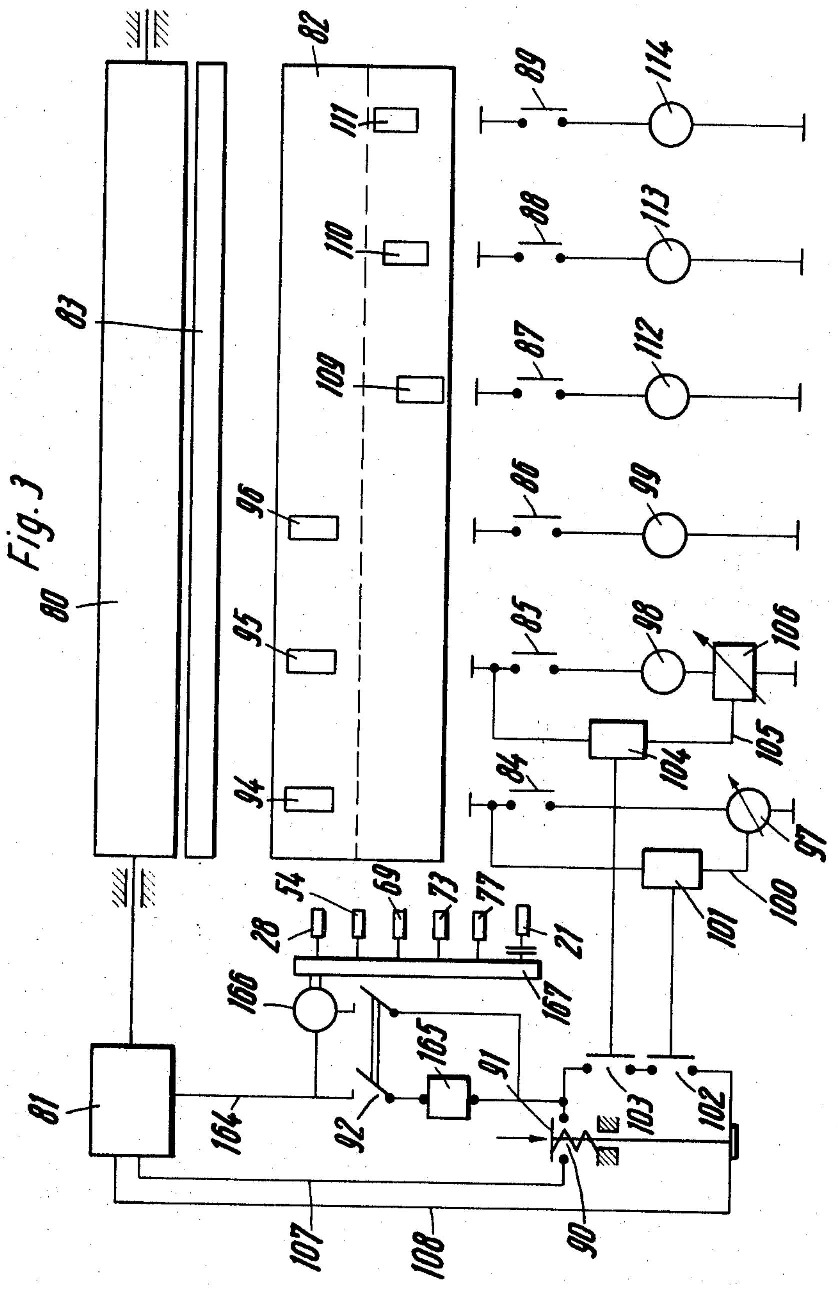
FIG. 3 is a diagrammatical view of a control for the apparatus of FIG. 1.

FIG. 3 shows diagrammatically a control device, comprising the control circuits, as well as the main drive with the motor 166 and drive elements connected to the drive by kinematic chains 167. These drive elements are provided for continuously revolving members, e.g. also for rollers 28, 54, 69, 73, 77, and one of rollers 26, 27 adapted to be driven by a flexible shaft.

One circuit 164 with the main switch 92 contains a power source 165. This main switch switches the main motor 166 to which the continuously revolving members are connected by kinematic chains 167.

In addition, a circuit is prepared for a stepping motor 81 operating a switching roller 80 in two steps as explained below.

The switching roller 80 has, as shown in the development 82, switching pins which collaborate with associated cams on a cam carrier 83. These cams close switches shown in FIG. 3, bottom, at 84–89.

The control circuit of the stepping motor has a switch contact 90 for a first rotational range, in which the switch may be operated, for example by closing the cover or by hand. This control branch is shown at 107.

During the first rotational range, cams 94, 95, 96 are effective, of which cam 94 operates the exposure timer 97, cam 95 a drive unit 98 for the operating means or eccentrics 44, 46, and cam 96 a drive means 99 for the withdrawing roller 62. The drive means 99 may be a motor or a clutch.

The exposure time may be preselected as shown by the arrow 97. Thus, the exposure timer also controls a parallel circuit 100 switched by the exposure timer. This parallel circuit contains a relay 101 which closes a switch 102 in a control circuit 108 for the second step of the switching roller 80. Connected in series with the switch 102 is a further switch 103 actuated by a relay 104 in a lead 105, located in the circuit of the drive unit 98 and switched by an adjustable timing member 106. This makes it possible to take into consideration that the developing device 17, 18 may remain switched on for periods of varying lengths.

During the closure of both switches 102 and 103, the control circuit 108 is effective and the switching roller is rotated through a further step. In this state the switch 90 is opened by raising the cover. A locking device may be provided.

During this, the switching cams 109 for operating the pair oF switching rollers 69, 70, i.e. the unlocking of the switching roller 70, 110 for unlocking the switching roller 30, and preferably already before that the switching cam 110 for operating the drive means 40, i.e. the eccentric 40, become effective. The circuits shown thereunder and comprising switches 87–89 have corresponding drive members 112, 113, 114 which may consist of motors and/or clutches or the like.

With this control mechanism, first during the closure of the cover a sheet of copying paper is moved with its leading edge into the ready position between the pair of switching rollers 69, 70, the exposure is released, and the developing or transfer device is operated once. During this an original is copied which has previously been placed under the cover. When the cover is lifted and the working periods for exposure and development are teminated, the sheet of copying paper is advanced by the pair of switching rollers 28, 30 through a corresponding step, so that the exposed portion moves in front of the contact pressure plate 17. The pair of switching rollers 69, 70 delivers a sheet of copying paper in front of the heating plate 18. Slightly before, the switching cam has moved the separating roller arrangement 25, 26 between the spaced apart plates 17, 18 and withdrawn it again. During this, a copying sheet which has already been present may be removed.

For the next exposure, an original is fitted and the cover is closed. The cams 94–96 release the exposure and prepare a new copying sheet, and cause the developing of transfer device 17, 18 to close and to re-open, whereupon during the next switchig steps, by means of cams 109–111, the separating and transport rollers 25, 26, the transfer material is stripped and transported by rollers 28, 30 to the storage reel, and the copying sheet with the picture is taken from the developing and transfer device and guided through the guide 52 to the delivery orifice 53.

I claim:

1. An improved device for producing copies, comprising a housing;

an exposure plate arranged within the housing;

a contact pressure cover mounted vertically movable on the housing and adapted to be moved into a closed position in which it rests on the exposure plate, and into an open position in which it is lifted off the exposure plate;

a light source arranged on the side of the exposure plate remote from the contact pressure cover;

a transfer and developing device arranged in the housing adjacent to the exposure plate;

a storage device for a band-like transfer material arranged in the housing in the form of a reel, said transfer material being guided over the exposure plate from one edge to another edge thereof, wherein the transfer and developing device is arranged at the said another edge of said exposure plate, so that an inlet into the transfer and developing device is arranged adjacent to said another edge of the exposure plate and an outlet of the transfer and developing device is arranged in spaced apart relationship from said another edge of the exposure plate;

means arranged in said housing for holding receiving material;

transport and guide means arranged between said means for holding receiving material and the inlet of the transfer and developing device;

a retaining and transport arrangement for holding receiving material in the guide and transport means in a ready position, such that the leading edge is immediately in front of the inlet to the transfer and developing device;

a separating and transport device, arranged in the housing at the outlet of the transfer and developing device;

a storage reel arranged in the housing for the transfer material, and to which the transfer material is guided by the separating and transport device which also transports the foliate receiving material separately after separation from the band-like transfer material to a delivery mechanism;

first and second switching and transport means; arranged in the housing of which the first switching and transport means are arranged in the path of the transfer material, and the second switching and transport means in the path of the receiving material at a point at which a sheet of receiving material is in the ready position; and controls for transporting both materials into the transfer and developing device, wherein the transfer material is advanced with a section exposed on the exposure plate of not more than the length of the exposure plate.

2. A device as set forth in claim 1, wherein the separating and transport device (25–27) is mounted on movable means adapted to move towards and from the outlet of the transfer and developing device and comprising a pair of transport rollers (25, 26) the rollers of which co-act for transporting a sheet of receiving material.

3. A device as set forth in claim 2, wherein the separating and transport device comprises additionally on the inlet side of the pair of transport rollers a deflecting roller (27) for the band-like transfer material, so as to deflect the same in front of the pair of transport rollers (25, 26) towards the storage reel (21).

4. A device as set forth in claim 2, wherein the transfer and developing device (17–18) is a thermal device comprising a plate-shaped heater (18) and an associated contact pressure plate (17), of which at least one element is mounted and guided movably in the working cycle in order to move the plate-shaped heater and the contact pressure plate towards each other, wherein the contact pressure plate (17) is arranged on the side of the plate-shaped heater (18) along which the transfer material (13) passes through the transfer and developing device, wherein the movable unit of the separating and transport device (25–27) is adapted to move towards the transfer and developing device and into a gap formed between the plate-shaped heater (18) and the contact pressure plate (17) when these are spread apart.

5. A device as set forth in claim 4, in which the plate-shaped heater (18) and the contact pressure plate (17) are mounted in the housing substantially vertically, but movably, and are operated by devices (44, 46, 48, 49) which spread the movable parts apart and bring them together, wherein the contact pressure plate (17) is suspended pivotably by hinge means from one edge of the exposure plate (5).

6. A device as set forth in claim 2, wherein the said operating means comprise a pivoting lever arrangement (22) in which one end is mounted in pivots (23) in the housing, and the other end carries the separating and transport device (25–27), wherein the pivoting lever arrangement is affected by operating means operating in opposite direction, of which one (40) causes the movement of the unit (25–27) into a gap between the transfer and developing device and another (39) tends to move the said unit out of this gap and to a point outside the transfer developing device.

7. A device as set forth in claim 4, comprising a deflectable finger (50) at the lower edge of the plate-shaped heater (18) and adapted to underlie the lower edge of the contact pressure plate and extending to the band-like transfer material, passing through the transfer and developing device, if the separating and transport device is in a position remote therefrom, wherein the said finger forms an abutment for a sheet of receiving material introduced into the transfer and developing device for guiding this sheet into the gap of the pair of transport rollers (25, 26).

8. A device as set forth in claim 4, wherein said means for holding receiving material comprises a stack arranged substantially vertically on the plate-shaped heater on the side thereof remote from the exposure device and comprising withdrawing means and deflecting means for joining with the guide and transport means.

9. A device as set forth in claim 8, wherein the withdrawing means are located at the bottom edge of the stack (58), and the guide and transport means comprise an upwardly directed guide (68) parallel to the stack, and comprising further a continuously revolving second pair of transport rollers (64, 65) adjacent to the lower end of th guide (68), the rollers of which run in contact with each other and form the holding and transport arrangement defining the ready position, wherein near the upper end of the guide first switching transport means are provided in the form of a pair of switching transport rollers for transferring the receiving material from the ready position into the transfer and developing device (17, 18).

10. A device as set forth in claim 1, comprising a receiving surface (75) in the housing mounted substantially in the plane of the exposure plate (5) and spaced apart from said another edge thereof, wherein this receiving surface is curved at the end facing the exposure plate downwardly towards the transfer and developing device (17, 18) and forms on its upper surface a path for an original carried on the transfer material from the exposure plate (5) and leading to a delivery device (77, 78, 79) and on its underside a path between the guide and transport means (64–71) leading into the inlet of the transfer and developing device.

11. A device as set forth in claim 1, wherein the first and second switching transport means are pairs of switching transport rollers (28, 30), each with a flattened roller and a continuously revolving roller, whereof the second pair of switching and transport rollers is arranged between the separating and transport device (25–17) and the storage reel (21) and may be actuated for a transportation length which corresponds to the length of a section of transfer material, exposed on the exposure plate, and transported into the transfer and developing device.

12. A device as set forth in claim 1, comprising a control device which energises during one working cycle the exposure light source for a certain time, simultaneously operates the withdrawing means (62) on the stack (58) and performs thereafter during a second step the release of the switching and transport means (28, 30; 69, 70) for the transfer material and for the receiving material for transporting these into the transfer and developing device, whereupon a further step of the control device initiates the movement (44, 46) of the transfer and developing device for closing and opening the same, whereupon the means (40) for moving the unit with the separating and transport device (25–27) are operated, and wherein the operating steps are matched in such a way that the operation of the device for moving the transfer and developing device takes place simultaneously with the switching on of the light source for a following copy.

* * * * *